(12) United States Patent
Ishihara (10) Patent No.: US 12,511,511 B2
(45) Date of Patent: Dec. 30, 2025

(54) DETECTION DEVICE

(71) Applicant: Magnolia White Corporation, Tokyo (JP)

(72) Inventor: Tomoyuki Ishihara, Tokyo (JP)

(73) Assignee: Magnolia White Corporation, Tokyo (JP)

(*) Notice: Subject to any disclaimer, the term of this patent is extended or adjusted under 35 U.S.C. 154(b) by 0 days.

(21) Appl. No.: 18/826,768

(22) Filed: Sep. 6, 2024

(65) Prior Publication Data

US 2025/0103845 A1 Mar. 27, 2025

(30) Foreign Application Priority Data

Sep. 22, 2023 (JP) ................. 2023-158317

(51) Int. Cl.
*G06K 19/07* (2006.01)
*G06K 7/10* (2006.01)
*G06K 19/077* (2006.01)

(52) U.S. Cl.
CPC ..... *G06K 19/0716* (2013.01); *G06K 19/0728* (2013.01); *G06K 19/07743* (2013.01); *G06K 19/07786* (2013.01)

(58) Field of Classification Search
CPC ....... G06K 19/07762; G06K 19/07743; G06K 19/0728; G06K 19/0716; G06K 19/07786; G06K 7/10722; G06K 7/10297; H01Q 5/22; G02B 6/0045; G02B 6/0011
See application file for complete search history.

(56) References Cited

U.S. PATENT DOCUMENTS

| 2011/0248851 A1* | 10/2011 | Pham ..... G07C 9/257 340/572.1 |
| 2017/0357843 A1* | 12/2017 | Chen ..... G06V 40/1365 |
| 2018/0279932 A1* | 10/2018 | Boone ..... A61B 5/0031 |

FOREIGN PATENT DOCUMENTS

| AU | 2013288772 B2 * | 4/2016 | ..... G06K 7/10297 |
| JP | 2006-318328 A | 11/2006 | |
| JP | 2018114650 A * | 7/2018 | |
| JP | 2023-040103 A | 3/2023 | |

OTHER PUBLICATIONS

"RF-DNA" Fingerprinting for Antenna Classification (Year: 2015).*
Terahertz Antenna System for a Near-Video-Rate Radar Imager (Year: 2010).*

* cited by examiner

Primary Examiner — Thien T Mai
(74) Attorney, Agent, or Firm — K&L Gates LLP (57) ABSTRACT

According to an aspect, a detection device includes: a light-transmitting light guide plate that has a first surface on one side in a first direction and on which an object to be detected is to be placed so as to overlap the first surface; an optical sensor that is disposed on the other side in the first direction with respect to the light guide plate so as to overlap the light guide plate and includes photodiodes; a light source that is adjacent to the light guide plate in a second direction intersecting the first direction and is configured to emit light to a side surface of the light guide plate; and an antenna coil overlapping at least one of the light guide plate and the optical sensor as viewed in the first direction. The optical sensor, the light source, and the antenna coil are electrically coupled to a control board.

8 Claims, 11 Drawing Sheets

DETECTION DEVICE

CROSS-REFERENCE TO RELATED APPLICATION

This application claims the benefit of priority from Japanese Patent Application No. 2023-158317 filed on Sep. 22, 2023, the entire contents of which are incorporated herein by reference.

BACKGROUND

1. Technical Field

What is disclosed herein relates to a detection device.

2. Description of the Related Art

Conventionally, as detection devices (authentication devices), authentication devices using a radio-frequency identifier (RFID) technology and authentication devices using a two-dimensional code are known.

As indicated in Japanese Patent Application Laid-open Publication No. 2023-040103, in a detection device using the RFID technology, an integrated circuit card (IC card) having a radio frequency (RF) tag and an RFID reader communicate with each other. Specifically, when the IC card is brought close to the RFID reader while radio waves are being emitted from the RFID reader, an antenna of the IC card receives the radio waves, and a current flows through the antenna to generate inductive power, causing the antenna to transmit information of the RF tag to the RFID reader.

As indicated in Japanese Patent Application Laid-open Publication No. 2006-318328, a detection device using a two-dimensional code uses a bar code or a quick response (QR) code (registered trademark) that is one type of the two-dimensional code, and an optical mechanism such as a lens. The optical mechanism is focused on a display surface on which the two-dimensional code is displayed, and reads the two-dimensional code.

A detection device is desired that includes both a detection device using the RFID technology and a detection device using a two-dimensional code, and improves accuracy of detection of the two-dimensional code serving as an object to be detected.

SUMMARY

According to an aspect, a detection device includes: a light-transmitting light guide plate that has a first surface on one side in a first direction and on which an object to be detected is to be placed so as to overlap the first surface; an optical sensor that is disposed on the other side in the first direction with respect to the light guide plate so as to overlap the light guide plate and includes a plurality of photodiodes arranged in a planar configuration; a light source that is disposed adjacent to the light guide plate in a second direction intersecting the first direction and is configured to emit light to a side surface of the light guide plate; and an antenna coil disposed so as to overlap at least either one of the light guide plate and the optical sensor as viewed in the first direction. The optical sensor, the light source, and the antenna coil are electrically coupled to a control board.

DETAILED DESCRIPTION

The following describes a mode (embodiment) for carrying out the present disclosure in detail with reference to the drawings. The present disclosure is not limited to the description of the embodiments given below. Components described below include those easily conceivable by those skilled in the art or those substantially identical thereto. In addition, the components described below can be combined as appropriate. What is disclosed herein is merely an example, and the present disclosure naturally encompasses appropriate modifications easily conceivable by those skilled in the art while maintaining the gist of the present disclosure.

To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the present disclosure and the drawings, and detailed description thereof may not be repeated where appropriate.

In XYZ coordinates in the drawings, a Z direction (first direction) corresponds to the up-down direction; an X direction (second direction) corresponds to the left-right direction; and a Y direction corresponds to the front-rear direction. The X direction intersects (is orthogonal to) the Y and Z directions; the Y direction intersects (is orthogonal to) the X and Z directions; and the Z direction intersects (is orthogonal to) the X and Y directions. A Z1 side is one side in the first direction, and a Z2 side is the other side in the first direction.

First Embodiment

Figure 1:
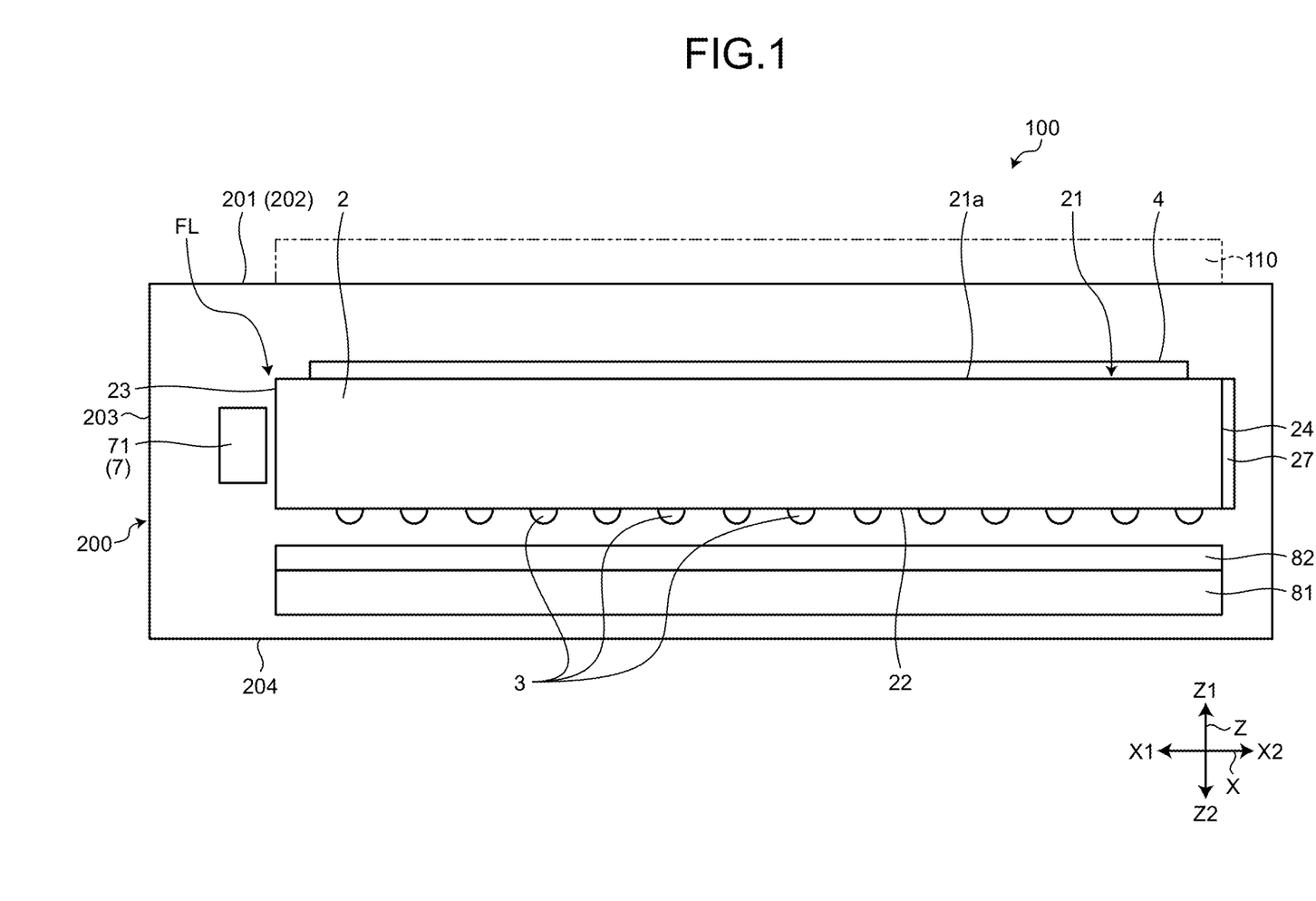
FIG. 1 is a side view schematically illustrating a detection device according to a first embodiment of the present disclosure.
Figure 2:
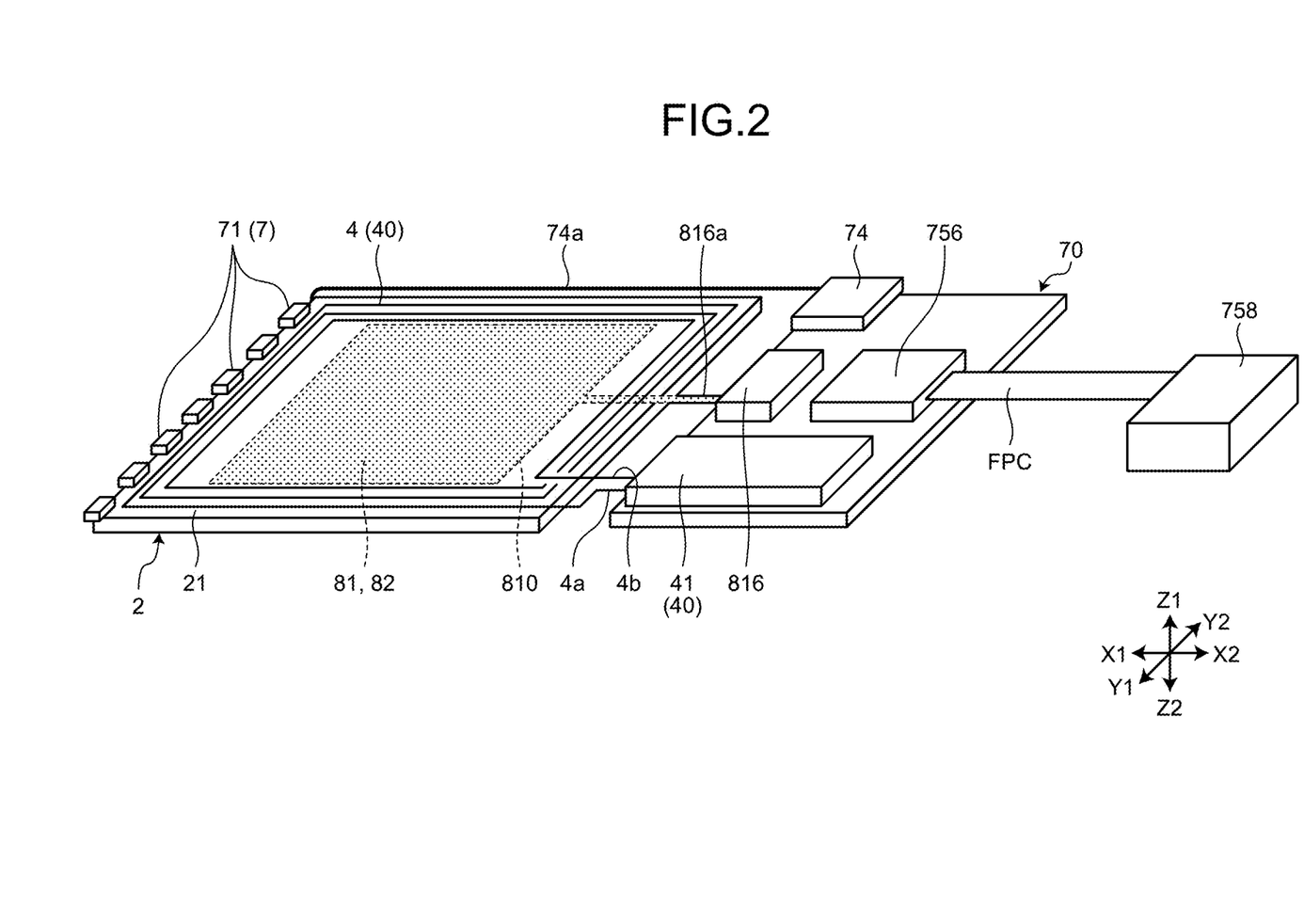
FIG. 2 is a perspective view schematically illustrating a portion of the detection device according to the first embodiment.
Figure 3:
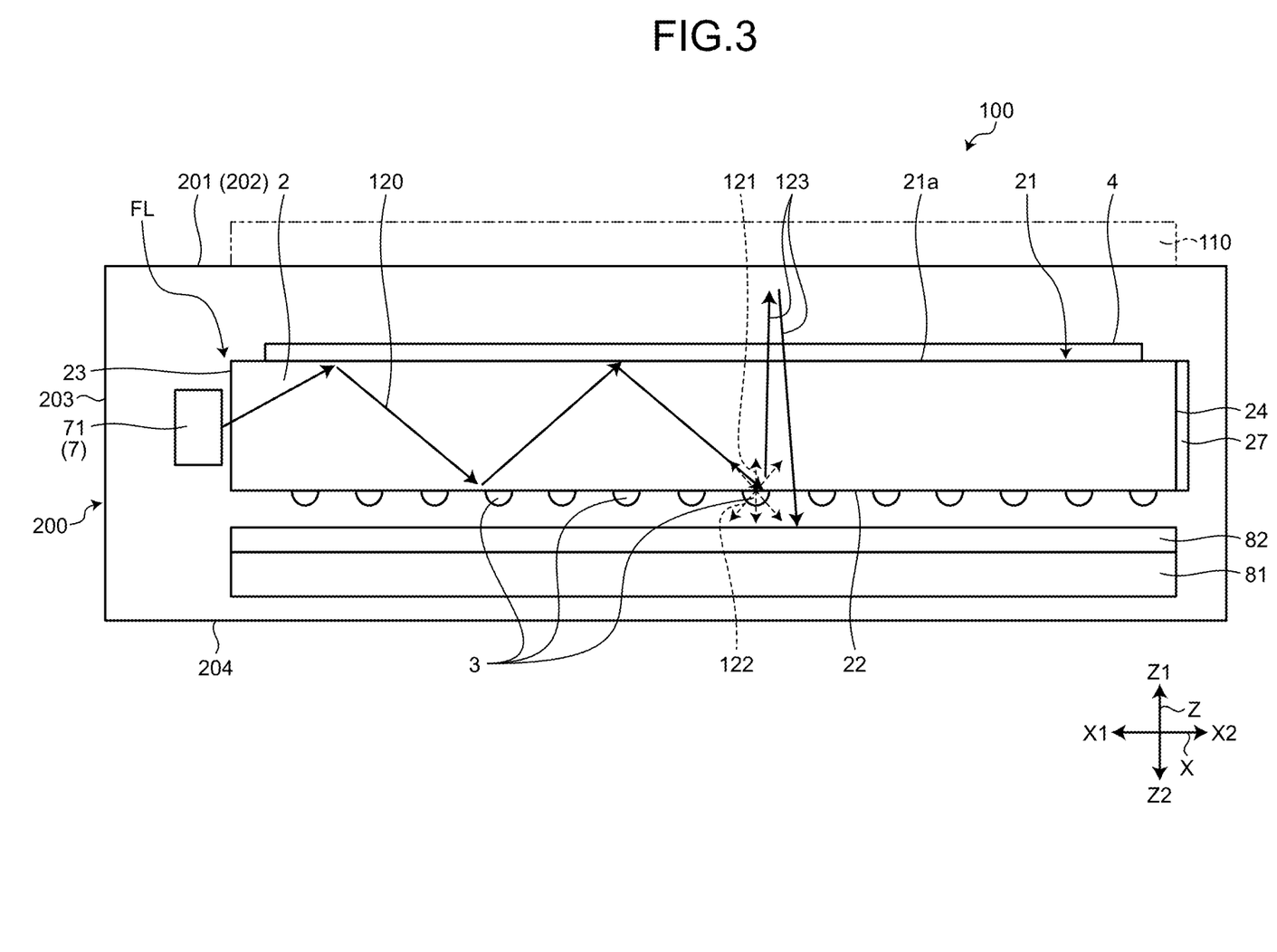
FIG. 3 is a side view schematically illustrating propagation of light in a light guide plate.
Figure 4:
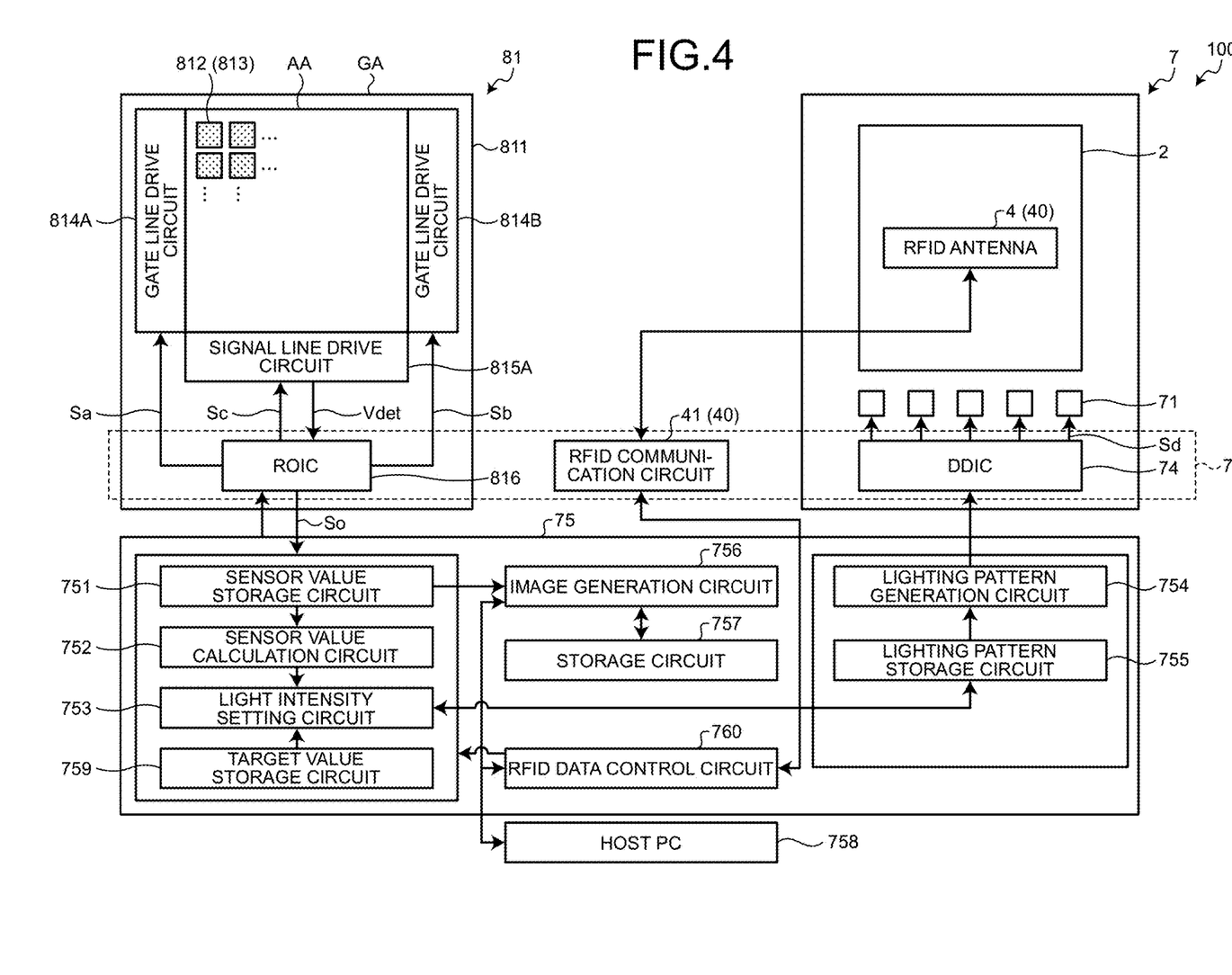
FIG. 4 is a block diagram illustrating a configuration example of the detection device according to the first embodiment.

First, a first embodiment of the present disclosure will be described. FIG. 1 is a side view schematically illustrating a detection device according to the first embodiment. FIG. 2 is a perspective view schematically illustrating a portion of the detection device according to the first embodiment. FIG. 3 is a side view schematically illustrating propagation of light in a light guide plate. FIG. 4 is a block diagram illustrating a configuration example of the detection device according to the first embodiment.

As illustrated in FIGS. 1 and 2, a detection device 100 includes a housing 200, a front light FL, an optical sensor 81, an optical filter 82, and an antenna coil (radio-frequency identifier (RFID) antenna) 4. The front light FL includes a light guide plate 2, scatterers 3, and a light source device 7. That is, in other words, the detection device 100 includes the housing 200, the light guide plate 2, the light source device 7, the scatterers 3, the optical sensor 81, the optical filter 82, and an RFID device 40.

As illustrated in FIG. 1, an object to be detected 110 is, for example, an integrated circuit card (IC card) or a smartphone having an RFID (radio frequency identifier) tag, or a card with a bar code or a quick response (QR) code (registered trademark) printed thereon. The IC card includes, for example, an antenna and an IC chip coupled to the antenna. The antenna transmits and receives signals using an electromagnetic induction method. For example, a passive tag that operates using radio waves from an RFID reader as a source of energy is applied as the RFID tag according to the present embodiment.

The housing 200 is a box-shaped case and has, for example, an upper surface 201, side surfaces 203, and a lower surface 204. The upper surface 201 has a placement surface 202 on which the object to be detected 110 is placed. The placement surface 202 has a light-transmitting property. The housing 200 accommodates therein the front light FL, the optical sensor 81, and the optical filter 82.

As illustrated in FIGS. 1 and 2, The light guide plate 2 has a light-transmitting property. The light guide plate 2 is a flat plate-shaped member. The light guide plate 2 has a first surface 21, a second surface 22, a side surface 23, and a back surface 24. The first surface 21 is a principal surface on the Z1 side, and the second surface 22 is a surface on the opposite side to the first surface 21 (that is, on the Z2 side). The side surface 23 is located on an X1 side, and the back surface 24 is located on an X2 side. A reflective plate 27 is bonded to the back surface 24. The reflective plate 27 reflects light 120 propagating in the light guide plate 2 to reduce the light 120 (refer to FIG. 3) leaking out of the light guide plate 2 from the back surface 24.

The light source device 7 faces the side surface 23 of the light guide plate 2. The light source device 7 is disposed on the X1 side of the side surface 23 of the light guide plate 2. The light source device 7 emits the light 120 (refer to FIG. 3) to the side surface 23 of the light guide plate 2. The light source device 7 includes a plurality of light sources 71, for example. The light sources 71 are a plurality of light-emitting diodes (LEDs), for example. That is, the light sources 71 are arranged along the Y direction and arranged so as to face the side surface 23 of the light guide plate 2.

As illustrated in FIG. 1, the scatterers 3 are provided on the second surface 22 of the light guide plate 2. The scatterers 3 cause the light 120 (refer to FIG. 3) that has entered the light guide plate 2 to exit toward the Z2 side (placement substrate side). The scatterer 3 are, for example, hemispherical light-transmitting members that convexly project toward the Z2 side from the second surface 22 of the light guide plate 2. The scatterers 3 are arranged along the X and Y directions in a matrix having a row-column configuration. The scatterers 3 are arranged at even intervals in the X and Y directions. The scatterer 3 may be recessed instead of projecting.

The following briefly describes a state of propagation of the light, with reference to FIG. 3. As illustrated in FIG. 3, the light 120 emitted from the light sources 71 enters the inside of the light guide plate 2 from the side surface 23 of the light guide plate 2, and propagates in the X direction in the light guide plate 2 while being totally reflected repeatedly on the first surface 21 and the second surface 22. Part of the light 120 propagating in the light guide plate 2 is scattered by the scatterer 3 and becomes scattered light 121. Light 123 that is part of the scattered light 121 exits from the first surface 21 of the light guide plate 2 to the object to be detected 110 and then reflected by the object to be detected 110. The reflected light is transmitted through the light guide plate 2 and the optical filter 82 to a plurality of photodiodes 813 of the optical sensor 81. The scattered light 121 scattered by the scatterer 3 includes also light 122 that is emitted to the optical filter 82, other than the light 123 that is emitted toward the object to be detected 110.

As illustrated in FIG. 1, the optical sensor 81 and the optical filter 82 are disposed on the Z2 side of the light guide plate 2 so as to overlap the light guide plate 2. The optical sensor 81 is disposed on the Z2 side of the optical filter 82. That is, the optical filter 82 is disposed between the optical sensor 81 and the light guide plate 2. The optical filter 82 is an optical element that transmits part of the light 123 reflected by the object to be detected 110 and traveling in the Z direction, toward the optical sensor 81. Examples of the optical filter 82 include a collimator (collimating apertures) and a louver. As illustrated in FIG. 2, a detection surface 810 is formed on the optical sensor 81. The detection surface 810 is an area provided with the photodiodes 813 in the optical sensor 81.

As illustrated in FIG. 2, the RFID device 40 includes an antenna coil (RFID antenna) 4 and an RFID communication circuit 41. The antenna coil 4 contains a metal or a light-transmitting conductive material. Examples of the light-transmitting conductive material include indium tin oxide (ITO). As illustrated in FIG. 1, the antenna coil 4 is disposed so as to overlap the object to be detected 110 as viewed in the Z direction. The antenna coil 4 is formed on the first surface 21 of the light guide plate 2 by, for example, printing. As illustrated in FIG. 2, in the first embodiment, the antenna coil 4 is disposed on the outer peripheral side of the detection surface 810 of the first surface 21 of the light guide plate 2 so as to wind around the detection surface 810, as viewed in the Z direction. Specifically, ends 4a and 4b of the antenna coil 4 are electrically coupled to the RFID communication circuit 41. The antenna coil 4 extends from the end 4a to the end 4b while winding around the outer peripheral side of the detection surface 810, for example, three times. In the present embodiment, the antenna coil 4 is substantially rectangular as viewed in the Z direction.

The following describes the configuration of the detection device in further detail with reference to FIGS. 2 and 4. As illustrated in FIG. 2 or 4, the detection device 100 includes the optical sensor 81, the light source device 7, the RFID device 40, and a control circuit 75. The optical sensor 81 includes an array substrate 811, a plurality of sensor pixels 812 (photodiodes 813) formed on the array substrate 811, gate line drive circuits 814A and 814B, a signal line drive circuit 815A, and a detection control circuit (ROIC) 816.

As illustrated in FIG. 4, the array substrate 811 is formed using a substrate as a base. Each of the sensor pixels 812 is configured with a corresponding one of the photodiodes 813, a plurality of transistors, and various types of wiring.

The array substrate 811 has a detection area AA and a peripheral area GA. The detection area AA is an area provided with the sensor pixels 812 (photodiodes 813). The peripheral area GA is an area between the outer perimeter of the detection area AA and the outer edges of the array substrate 811, and is an area not provided with the sensor pixels 812. The gate line drive circuits 814A and 814B, the signal line drive circuit 815A, and the detection control circuit 816 are provided in the peripheral area GA. The detection control circuit 816 is electrically coupled to the optical sensor 81 through wiring 816a (refer to FIG. 2).

Each of the sensor pixels 812 is an optical sensor that includes the photodiode 813 as a sensor element. Each of the photodiodes 813 outputs an electrical signal corresponding to light received by the photodiode 813.

The detection control circuit 816 is a circuit that supplies control signals Sa, Sb, and Sc to the gate line drive circuits 814A and 814B and the signal line drive circuit 815A, respectively, to control operations of these circuits. The detection control circuit 816 includes a signal processing circuit that processes a detection signal Vdet from each of the photodiodes 813.

The detection control circuit 816 processes the detection signals Vdet from the photodiodes 813, and outputs sensor values So based on the detection signals Vdet to the control circuit 75. Through this operation, the detection device 100 detects information on the object to be detected 110 (such as a bar code or a QR code (registered trademark)).

The light source device 7 includes the light sources 71 and a light-emitting element control circuit (DDIC) 74. The light sources 71 are electrically coupled to the light-emitting element control circuit 74 through wiring 74a (refer to FIG. 2).

As described above, the light sources 71 are arranged so as to face the side surface 23 of the light guide plate 2. The light sources 71 are driven between on (lit state) and off (unlit state) by a command Sd of the light-emitting element control circuit 74.

The control circuit 75 is configured as a control IC, for example. The control circuit 75 serves as a control circuit for the optical sensor 81 and includes a sensor value storage circuit 751, a sensor value calculation circuit 752, a light intensity setting circuit 753, a target value storage circuit 759, an image generation circuit 756, and a storage circuit 757. The sensor value storage circuit 751 stores therein the sensor values So output from the detection control circuit 816 of the optical sensor 81. The sensor value calculation circuit 752 performs a predetermined calculation process on the sensor values So of the photodiodes 813.

In a light intensity setting mode, the light intensity setting circuit 753 compares the sensor values So detected by the photodiodes 813 with a preset target sensor value So-t acquired from the target value storage circuit 759 to set light intensities of the light sources 71 for detection. The target value storage circuit 759 stores therein the preset target sensor value So-t.

In a detection mode, the image generation circuit 756 generates an image of the object to be detected 114 based on the sensor values So output from the photodiodes 813.

The storage circuit 757 stores therein base image data. The base image data is data obtained by detecting, by the optical sensor 81, the light emitted from the light sources 71 when the placement surface 202 is shielded by a non-light-transmitting member.

The control circuit 75 serves as a control circuit for the light source device 7 and includes a lighting pattern generation circuit 754 and a lighting pattern storage circuit 755. The lighting pattern storage circuit 755 stores therein information on the light intensity of each of the light sources 71 in the light intensity setting mode.

The lighting pattern generation circuit 754 generates various control signals based on the information on the light intensity in the lighting pattern storage circuit 755.

The RFID device 40 includes the antenna coil 4 and the RFID communication circuit 41. The antenna coil 4 is electrically coupled to the RFID communication circuit 41. The RFID communication circuit 41 receives information of the RFID tag of the object to be detected 110 via the antenna coil 4. The RFID communication circuit 41 is electrically coupled to an RFID data control circuit 760, and the RFID data control circuit 760 is electrically coupled to a host personal computer (PC) 758. The information of the RFID tag is transmitted from the RFID communication circuit 41 to the RFID data control circuit 760, and the information of the RFID tag is transmitted and received between the RFID communication circuit 41 and the RFID data control circuit 760.

As illustrated in FIG. 2, the host PC 758 is electrically coupled to the image generation circuit 756 through a flexible printed circuit (FPC). The host PC 758 performs an authentication process. The authentication process is, for example, a process in which, when purchase is made using an IC card, the host PC 758 confirms that the account balance data written in the IC card is greater than the price of a product and deducts the price of the product from the account balance of the IC card. The optical sensor 81, the light sources 71, and the antenna coil 4 are electrically coupled to a control board 70 that includes the detection control circuit 816, the light-emitting element control circuit 74, and the RFID communication circuit 41.

Figure 5:
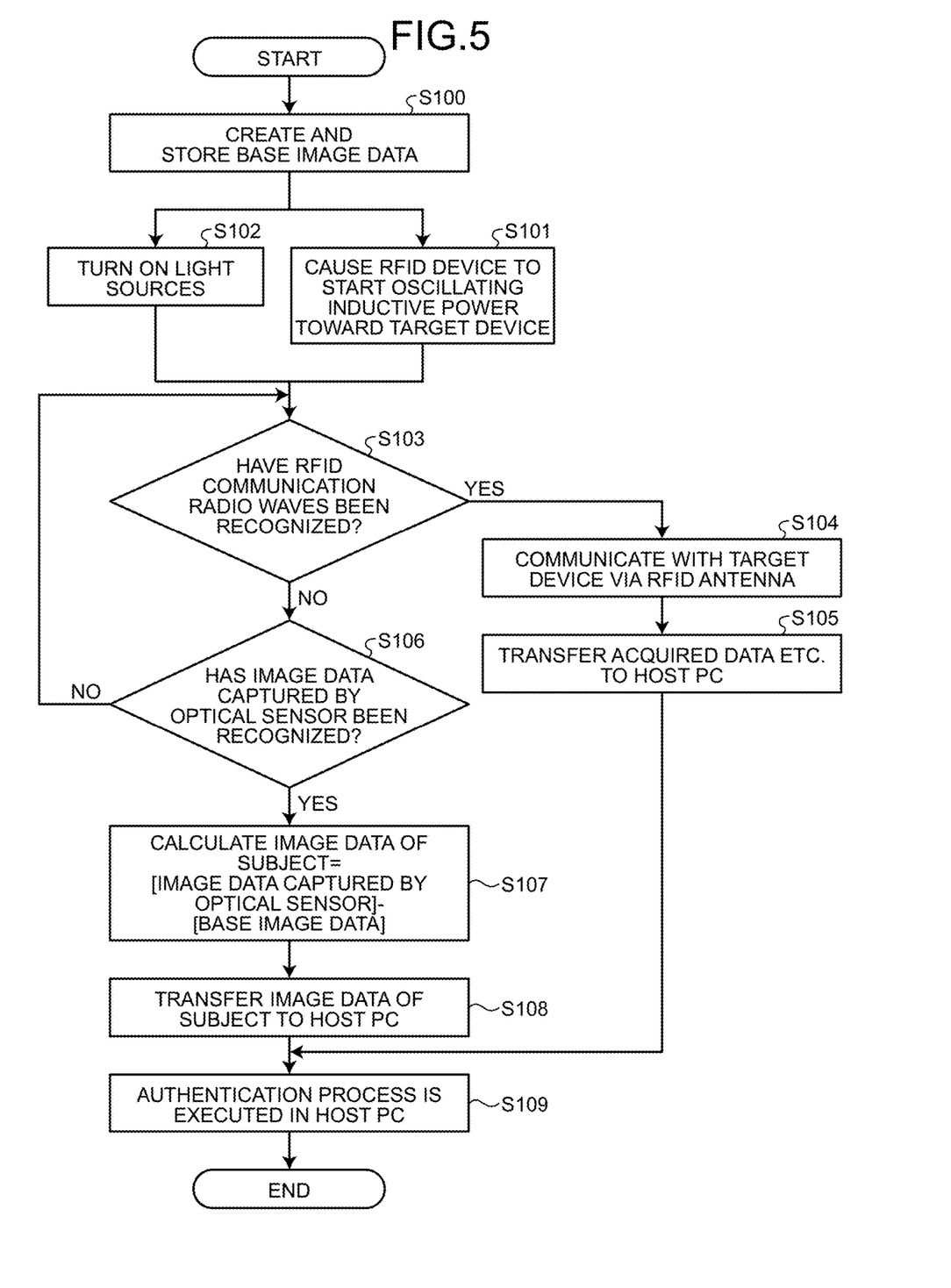
FIG. 5 is a flowchart illustrating a detection operation example of the detection device according to the first embodiment.
Figure 6:
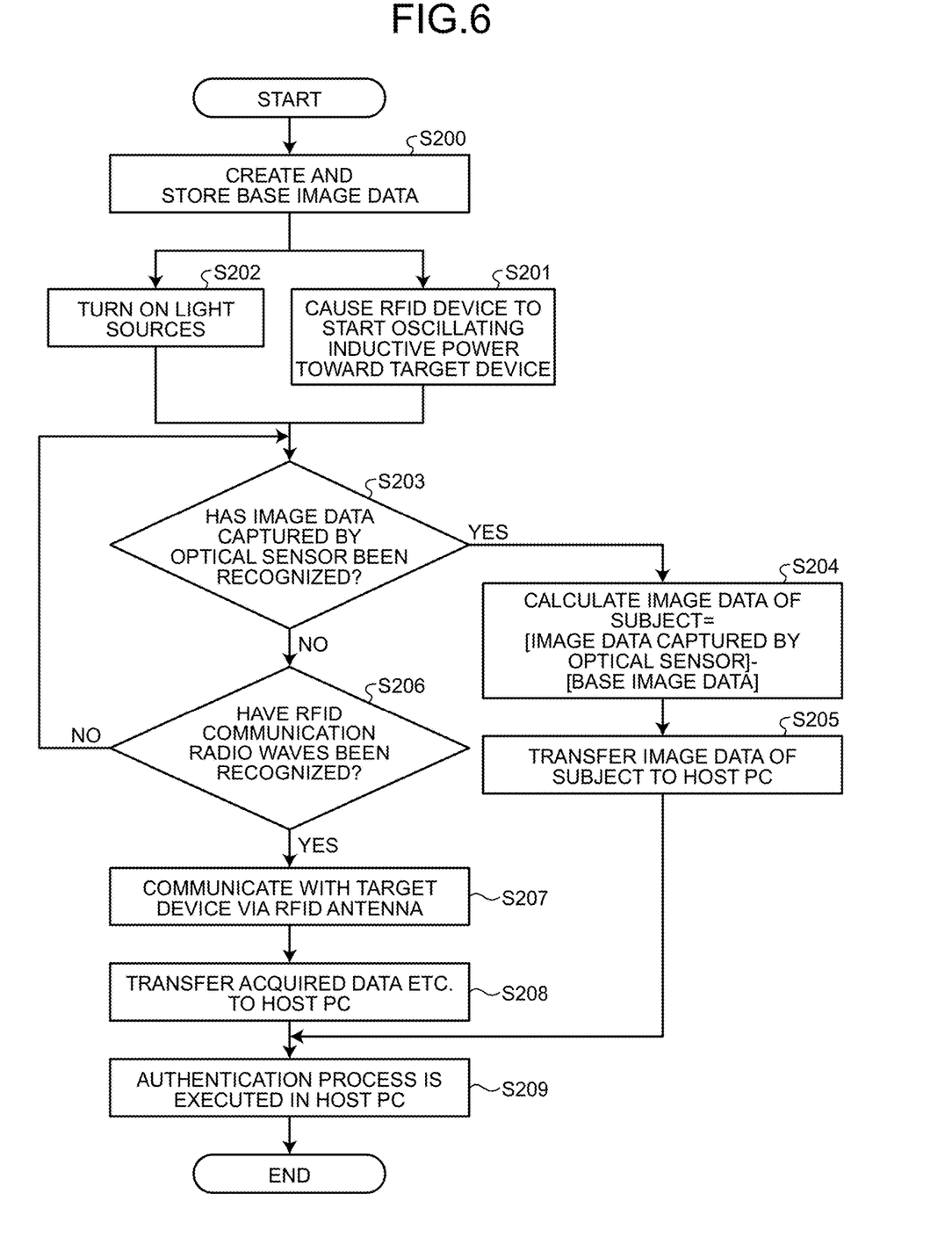
FIG. 6 is a flowchart illustrating another aspect of the detection operation example of the detection device according to the first embodiment.

The following describes a detection operation example of the detection device with reference to FIGS. 5 and 6. FIG. 5 is a flowchart illustrating the detection operation example of the detection device according to the first embodiment. FIG. 6 is a flowchart illustrating another aspect of the detection operation example of the detection device according to the first embodiment. FIG. 5 is a flowchart in which information acquisition by the RFID communication is prioritized, and FIG. 6 is a flowchart in which information acquisition based on image data is prioritized.

Which of the information acquisition by the RFID communication and the information acquisition based on the image data is prioritized, is set by a computer program in advance. First, FIG. 5 will be described in which the information acquisition by the RFID communication is prioritized.

As illustrated in FIG. 5, first, the base image data is created and stored (Step S100). Specifically, the storage circuit 757 stores therein the base image data obtained by detecting, using the optical sensor 81, the light emitted from the light sources 71 when the placement surface 202 is shielded by the non-light-transmitting member.

Then, the radio waves are emitted from the RFID device (RFID reader) 40 (Step S101). The IC card or the like having the RFID tag that is an example of the object to be detected 110 (target device) includes, for example, the antenna and the IC chip. The antenna transmits and receives signals using the electromagnetic induction method, and the IC chip is coupled to the antenna, as described above. Therefore, when the IC card is placed on the placement surface 202 of the housing 200 while the radio waves are being emitted from the RFID device 40, the antenna of the RFID tag of the IC card receives the radio waves, a current flows through the antenna to generate inductive power, and the information of the RFID tag is transmitted from the antenna of the RFID tag to the RFID device 40.

At the same time as Step S101, the light source device 7 turns on the light sources 71 based on a control signal from the lighting pattern generation circuit 754 (refer to FIG. 4) (Step S102).

Then, the control circuit 75 determines whether the RFID device 40 has received the information from the RFID tag (Step S103). When the control circuit 75 determines that the RFID device 40 has received the information from the RFID tag, information communication is performed between the IC card and the RFID device 40 (Step S104). The control circuit 75 transfers the information from the RFID tag to the host PC 758 (refer to FIG. 4) (Step S105).

In contrast, when the control circuit 75 determines that the RFID device 40 has not received the information from the RFID tag at Step S103, the detection control circuit 816 processes the detection signals Vdet from the photodiodes 813, and the control circuit 75 determines whether image data captured by the optical sensor 81 has been recognized (Step S106).

At Step S106, when the control circuit 75 determines that image data captured by the optical sensor 81 has been recognized, differential image data (image data of the subject) is calculated (Step S107). When the control circuit 75 determines that image data captured by the optical sensor 81 has been recognized, the process returns to Step S103.

The differential image data is data obtained by subtracting the base image data obtained at Step S100 from the image data captured by the optical sensor 81. Specifically, the differential image data indicating the detection result of the IC card or the like serving as a subject is obtained based on the difference between the base image data and the captured image data. The differential image data is calculated by the image generation circuit 756 (refer to FIG. 4). The differential image data is transferred to the host PC 758 (Step S108). Then, the authentication process is executed in the host PC 758 (Step S109). As described above, the authentication process is, for example, the process in which, when purchase is made using the IC card, the host PC 758 deducts the price of a product from the account balance data written in the IC card.

The following describes FIG. 6 in which the information acquisition based on the image data is prioritized.

As illustrated in FIG. 6, first, the base image data is created and stored (Step S200). Specifically, the storage circuit 757 stores therein the base image data obtained by detecting, using the optical sensor 81, the light emitted from the light sources 71 when the placement surface 202 is shielded by the non-light-transmitting member.

Then, the radio waves are emitted from the RFID device (RFID reader) 40 (Step S201). The IC card or the like having the RFID tag that is an example of the object to be detected 110 includes, for example, the antenna and the IC chip. The antenna transmits and receives signals using the electromagnetic induction method, and the IC chip is coupled to the antenna, as described above. Therefore, when the IC card is placed on the placement surface 202 of the housing 200 while the radio waves are being emitted from the RFID device 40, the antenna of the RFID tag of the IC card receives the radio waves, a current flows through the antenna to generate inductive power, and the information of the RFID tag is transmitted from the antenna of the RFID tag to the RFID device 40.

At the same time as Step S201, the light source device 7 turns on the light sources 71 based on a control signal from the lighting pattern generation circuit 754 (refer to FIG. 4) (Step S202).

Then, the detection control circuit 816 processes the detection signals Vdet from the photodiodes 813, and the control circuit 75 determines whether the image data captured by the optical sensor 81 has been recognized (Step S203).

At Step S203, when the control circuit 75 determines that the image data captured by the optical sensor 81 has been recognized, the differential image data is calculated (Step S204). When the control circuit 75 determines that the image data captured by the optical sensor 81 has not been recognized, the process proceeds to Step S206.

The differential image data is data obtained by subtracting the base image data obtained at Step S200 from the image data captured by the optical sensor 81. Specifically, the differential image data indicating the detection result of the IC card or the like serving as the subject is obtained based on the difference between the base image data and the captured image data. The differential image data is calculated by the image generation circuit 756 (refer to FIG. 4). The differential image data is transferred to the host PC 758 (Step S205).

In contrast, when, at Step S203, the control circuit 75 determines that the image data captured by the optical sensor 81 has not been recognized, the control circuit 75 determines whether the RFID device 40 has received the information from the RFID tag (Step S206).

When, at Step S206, the control circuit 75 determines that the RFID device 40 has received the information from the RFID tag, information communication is performed between the IC card and the RFID device 40 (Step S207). When, at Step S206, the control circuit 75 determines that the RFID device 40 has not received the information from the RFID tag, the process returns to Step S203. The control circuit 75 transfers the information from the RFID tag to the host PC 758 (refer to FIG. 4) (Step S208). Then, the authentication process is executed in the host PC 758 (Step S209).

As described above, the detection device 100 according to the first embodiment includes the light guide plate 2, the optical sensor 81, the light sources 71, and the antenna coil 4. The optical sensor 81, the light sources 71, and the antenna coil 4 are electrically coupled to the control board 70.

The detection device 100 according to the present embodiment has two functions: an RFID reader function including the antenna coil 4; and a two-dimensional code reading function including the light sources 71, the light guide plate 2, and the optical sensor 81. The detection device 100 according to the present embodiment is a device in which a detection device using the RFID technology and a detection device using the two-dimensional code are integrated with each other, so that the space can be saved. In addition, in the present embodiment, the light sources 71 are arranged facing the side surface 23 of the light guide plate 2; the optical sensor 81 is disposed facing the second surface 22 of the light guide plate 2; and the two-dimensional code serving as the object to be detected 110 is disposed facing the first surface 21 of the light guide plate 2. Therefore, the light 120 reflected by the two-dimensional code passes through the light guide plate 2 and reaches the photodiodes (photodetection elements) 813 regardless of the degree of optical transmittance of the two-dimensional code. Consequently, according to the present embodiment, the detection device 100 that improves the accuracy of detection of the two-dimensional code can be provided. The position of the antenna coil 4 is set at a location where the light from the light sources 71 is difficult to be blocked, so that degradation of the two-dimensional code reading function due to the RFID reader is reduced.

The antenna coil 4 contains metal. The metal has higher sensitivity of receiving the radio waves, thus improving the accuracy of detection of information of the RFID tag of the object to be detected 110 including the IC card.

The antenna coil 4 contains a light-transmitting conductive material. With this configuration, the light 120 can more easily reach the photodiodes (photodetection elements) 813 of the optical sensor 81 than when the antenna coil 4 contains metal, and the accuracy of detection of the object to be detected 110 is improved.

The second surface 22 of the light guide plate 2 has the scatterers 3 that cause the light 120 incident from the light sources 71 to exit from the first surface 21.

The light 120 emitted from the light sources 71 enters the inside of the light guide plate 2 from the side surface 23 of the light guide plate 2 and propagates in the light guide plate 2 while being totally reflected repeatedly on the first surface 21 and the second surface 22. Therefore, part of the light 120 is caused to exit from the first surface 21 by providing the scatterers 3 on the second surface 22. The light 120 from the first surface 21 is reflected by the object to be detected 110, transmitted through the light guide plate 2, and reaches the photodiodes (photodetection elements) 813 of the optical sensor 81. As a result, the accuracy of detection of the object to be detected 110 increases.

The antenna coil 4 is provided on the first surface 21 of the light guide plate 2. With this configuration, when the object to be detected 110 is placed on the placement surface 202 of the housing 200, the distance between the antenna coil 4 and the object to be detected 110 becomes smaller. Therefore, the reception sensitivity of the antenna coil 4 becomes higher when the antenna coil 4 receives the radio waves emitted from the object to be detected 110.

The detection device 100 includes the image generation circuit 756 and the RFID communication circuit 41. The image generation circuit 756 performs a first process to calculate the differential image data indicating the detection result of the object to be detected 110 based on the difference between the image data of the object to be detected 110 captured by the optical sensor 81 and the base image data. The RFID communication circuit 41 performs a second process to receive the information of the RFID tag of the object to be detected 110 via the antenna coil 4.

With this configuration, the detection device 100 that has both the RFID reader function and the two-dimensional code reading function can be obtained.

The second process is omitted when the first process is established, and the first process is omitted when the second process is established.

With this configuration, the detection device 100 that automatically selects either the RFID reader function or the two-dimensional code reading function can be obtained.

Second Embodiment

Figure 7:
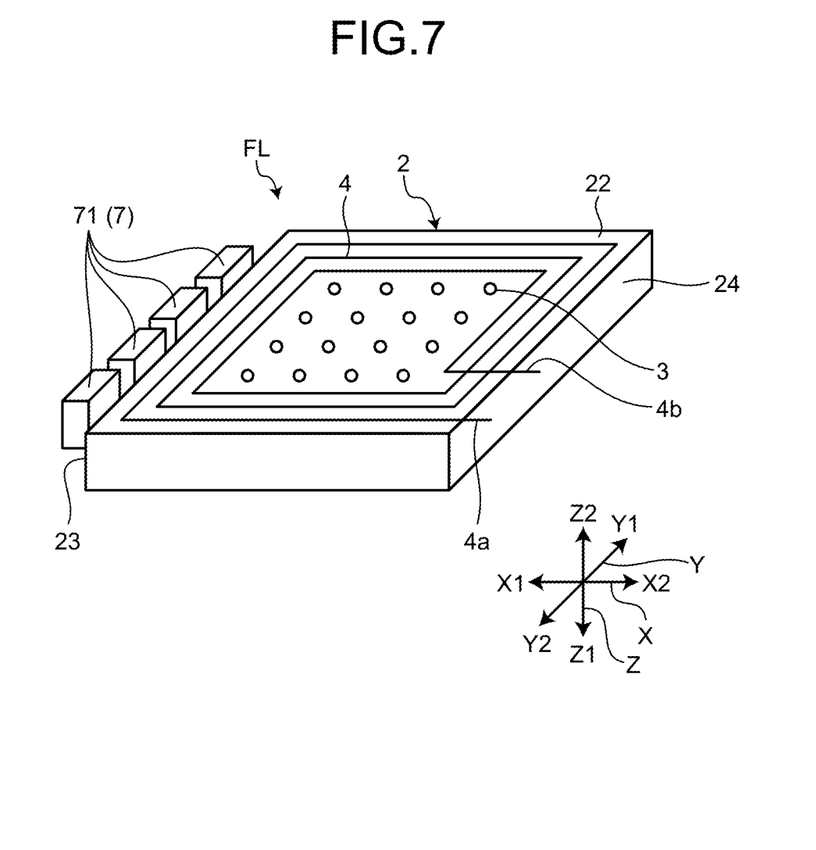
FIG. 7 is a perspective view schematically illustrating a portion of a detection device according to a second embodiment of the present disclosure.

The following describes a second embodiment of the present disclosure. FIG. 7 is a perspective view schematically illustrating a portion of a detection device according to the second embodiment.

In the first embodiment, the antenna coil 4 is provided on the first surface 21 of the light guide plate 2. In the second embodiment, the antenna coil 4 is provided on the second surface 22 of the light guide plate 2. A specific description will be given below.

As illustrated in FIG. 7, the scatterers 3 are arranged in a matrix having a row-column configuration at substantially even intervals in a central portion of the second surface 22 of the light guide plate 2. The antenna coil 4 is provided at a location on the outer peripheral side of the scatterers 3. The antenna coil 4 according to the present embodiment contains metal, for example, but may contain a light-transmitting conductive material. The antenna coil 4 is disposed on the outer peripheral side of the detection surface 810 of the second surface 22 of the light guide plate 2 so as to wind around the detection surface 810, as viewed in the Z direction. Specifically, the ends 4a and 4b of the antenna coil 4 are electrically coupled to the RFID communication circuit 41 (refer to FIG. 2). The antenna coil 4 extends from the end 4a to the end 4b while winding around the outer peripheral side of the detection surface 810, for example, three times. In the present embodiment, the antenna coil 4 is substantially rectangular as viewed in the Z direction.

As described above, according to the second embodiment, the antenna coil 4 is provided on the second surface 22 of the light guide plate 2. This configuration allows the light guide plate 2 to be positioned closer to the placement surface 202 of the housing 200. That is, since the antenna coil 4 is not provided on the first surface 21 of the light guide plate 2, the distance between the first surface 21 of the light guide plate 2 and the placement surface 202 of the housing 200 can be set smaller. Therefore, the housing 200 can be more downsized.

Third Embodiment

Figure 8:
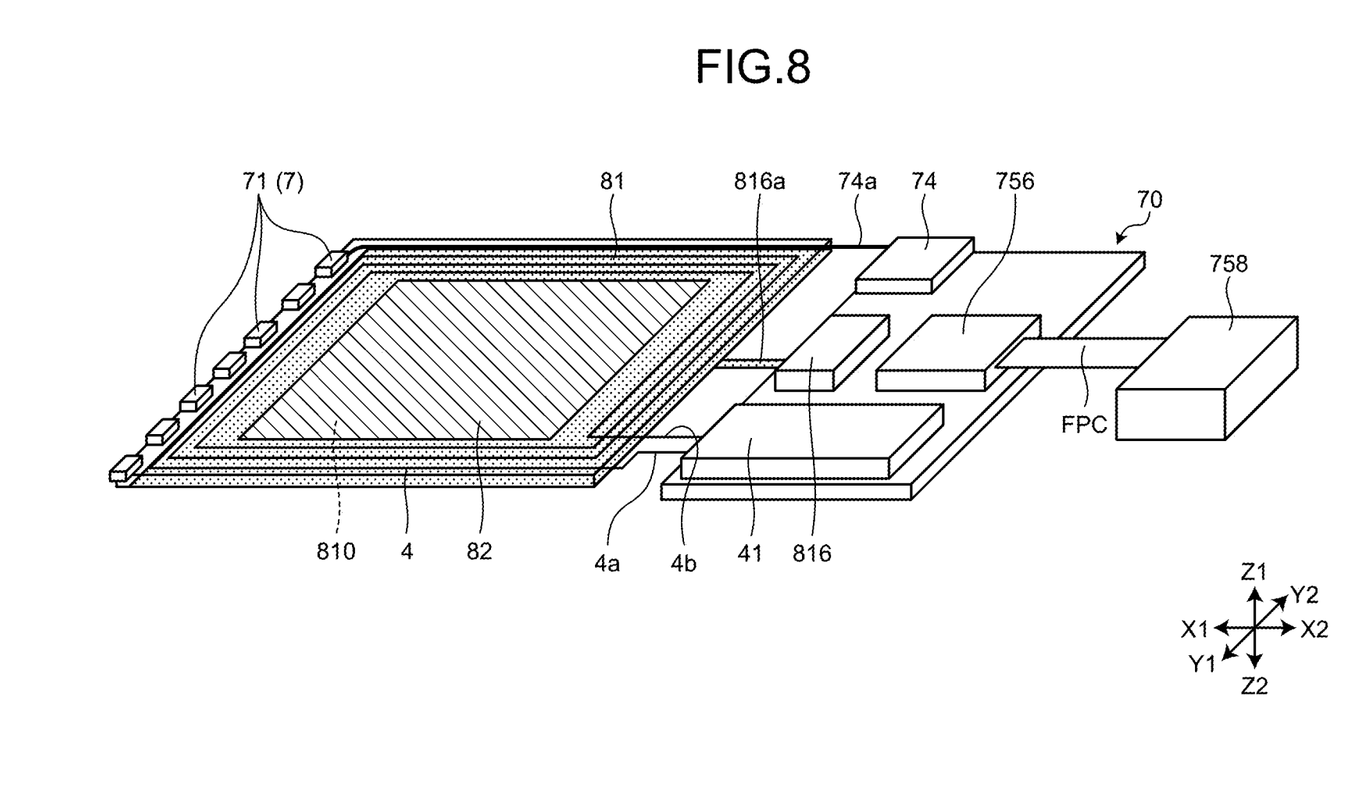
FIG. 8 is a perspective view schematically illustrating a portion of a detection device according to a third embodiment of the present disclosure.

The following describes a third embodiment of the present disclosure. FIG. 8 is a perspective view schematically illustrating a portion of a detection device according to the third embodiment.

In the first embodiment, the antenna coil 4 is provided on the first surface 21 of the light guide plate 2. In the third embodiment, the antenna coil 4 is provided on the optical sensor 81. A specific description will be given below.

As illustrated in FIG. 8, the optical sensor 81 and the optical filter 82 are substantially rectangular as viewed in the Z direction. The optical filter 82 is disposed on the upper side (Z1 side) of the optical sensor 81. The optical filter 82 has a smaller rectangular shape than the optical sensor 81. The optical filter 82 is disposed in a central portion of the optical sensor 81. The antenna coil 4 is provided at a location on the outer peripheral side of the optical filter 82 on the upper surface of the optical sensor 81. The antenna coil 4 according to the present embodiment contains metal, for example, but may contain a light-transmitting conductive material. The antenna coil 4 is disposed on the outer peripheral side of the detection surface 810 so as to wind around the detection surface 810, as viewed in the Z direction. In the third embodiment, the photodiodes 813 are provided in an area overlapping the optical filter 82 as viewed in the Z direction. Therefore, an area of the upper surface of the optical sensor 81 illustrated by hatching in FIG. 8 serves as the detection surface 810.

The ends 4a and 4b of the antenna coil 4 are electrically coupled to the RFID communication circuit 41 (refer to FIG. 8). The antenna coil 4 extends from the end 4a to the end 4b while winding around the outer peripheral side of the detection surface 810, for example, three times. In the present embodiment, the antenna coil 4 is substantially rectangular as viewed in the Z direction.

As described above, according to the third embodiment, the antenna coil 4 is disposed on the outer peripheral side of the detection surface 810 of the optical sensor 81 so as to wind around the detection surface 810, as viewed in the Z direction.

In other words, the antenna coil 4 does not overlap the detection surface 810 of the optical sensor 81 as viewed in the Z direction. Therefore, the progression of the light 120 transmitted through the light guide plate 2 toward the photodiodes (photodetection elements) 813 is restrained from being hindered, and the accuracy of detection of the object to be detected 110 is improved.

Fourth Embodiment

Figure 9A:
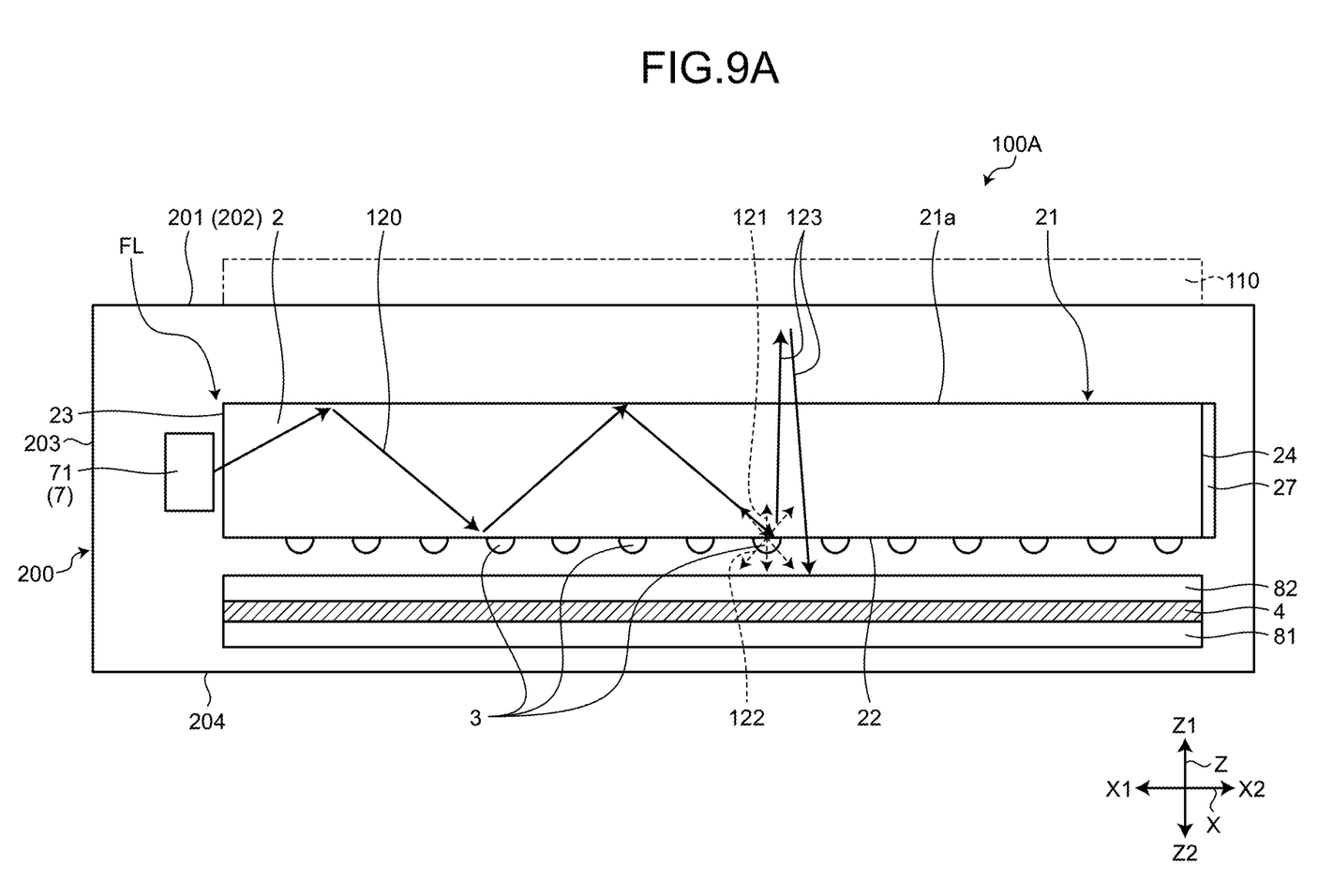
FIG. 9A is a sectional view schematically illustrating a portion of a detection device according to a fourth embodiment of the present disclosure.
Figure 9B:
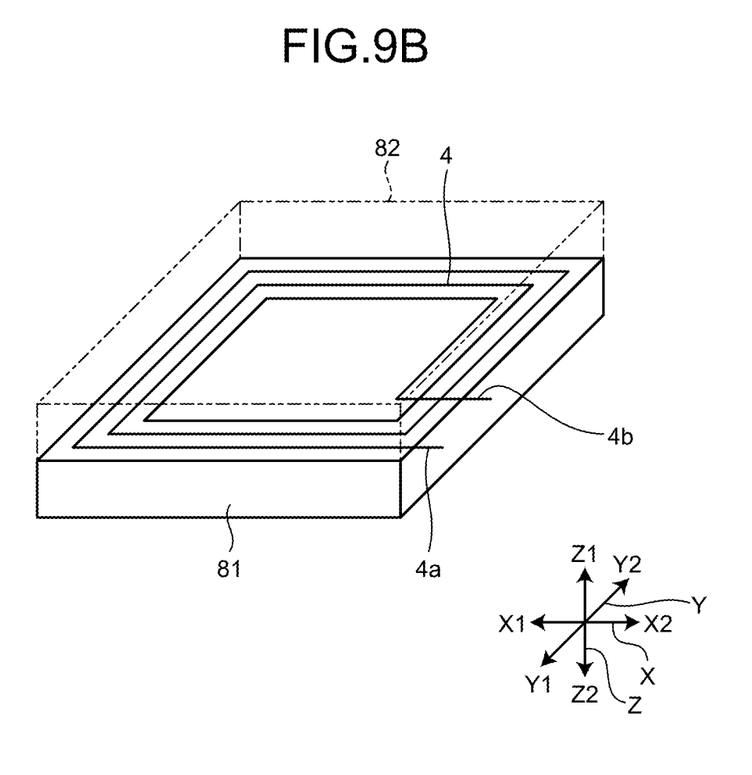
FIG. 9B is a perspective view schematically illustrating a portion of the detection device according to the fourth embodiment.

The following describes a fourth embodiment of the present disclosure. FIG. 9A is a sectional view schematically illustrating a portion of a detection device according to the fourth embodiment. FIG. 9B is a perspective view schematically illustrating a portion of the detection device according to the fourth embodiment.

In the first embodiment, the antenna coil 4 is provided on the first surface 21 of the light guide plate 2, but in the fourth embodiment, the antenna coil 4 is provided between the optical sensor 81 and the optical filter 82. A specific description will be given below.

As illustrated in FIGS. 9A and 9B, the optical filter 82 is disposed on the upper side (Z1 side) of the optical sensor 81. The optical filter 82 and the optical sensor 81 have rectangular shapes having substantially the same size as viewed in the Z direction. The antenna coil 4 according to the present embodiment contains metal, for example, but may contain a light-transmitting conductive material. As illustrated in FIG. 9B, the antenna coil 4 extends from the end 4a to the end 4b while winding around the outer periphery of the optical filter 82 and the optical sensor 81, for example, three times, as viewed in the Z direction. In the present embodiment, the antenna coil 4 is substantially rectangular as viewed in the Z direction.

As described above, according to the fourth embodiment, the optical filter 82 is provided between the light guide plate 2 and the optical sensor 81. With this configuration, the optical filter 82 causes a larger amount of the light 120 that has been reflected by the object to be detected 110 and transmitted through the light guide plate 2 to travel toward the photodiodes 813, so that the accuracy of detection of the object to be detected 110 can increase.

The antenna coil 4 is provided between the optical filter 82 and the optical sensor 81. With this configuration, a reduction in manufacturing cost can be achieved by integrally forming the optical filter 82, the optical sensor 81, and the antenna coil 4.

Fifth Embodiment

Figure 10:
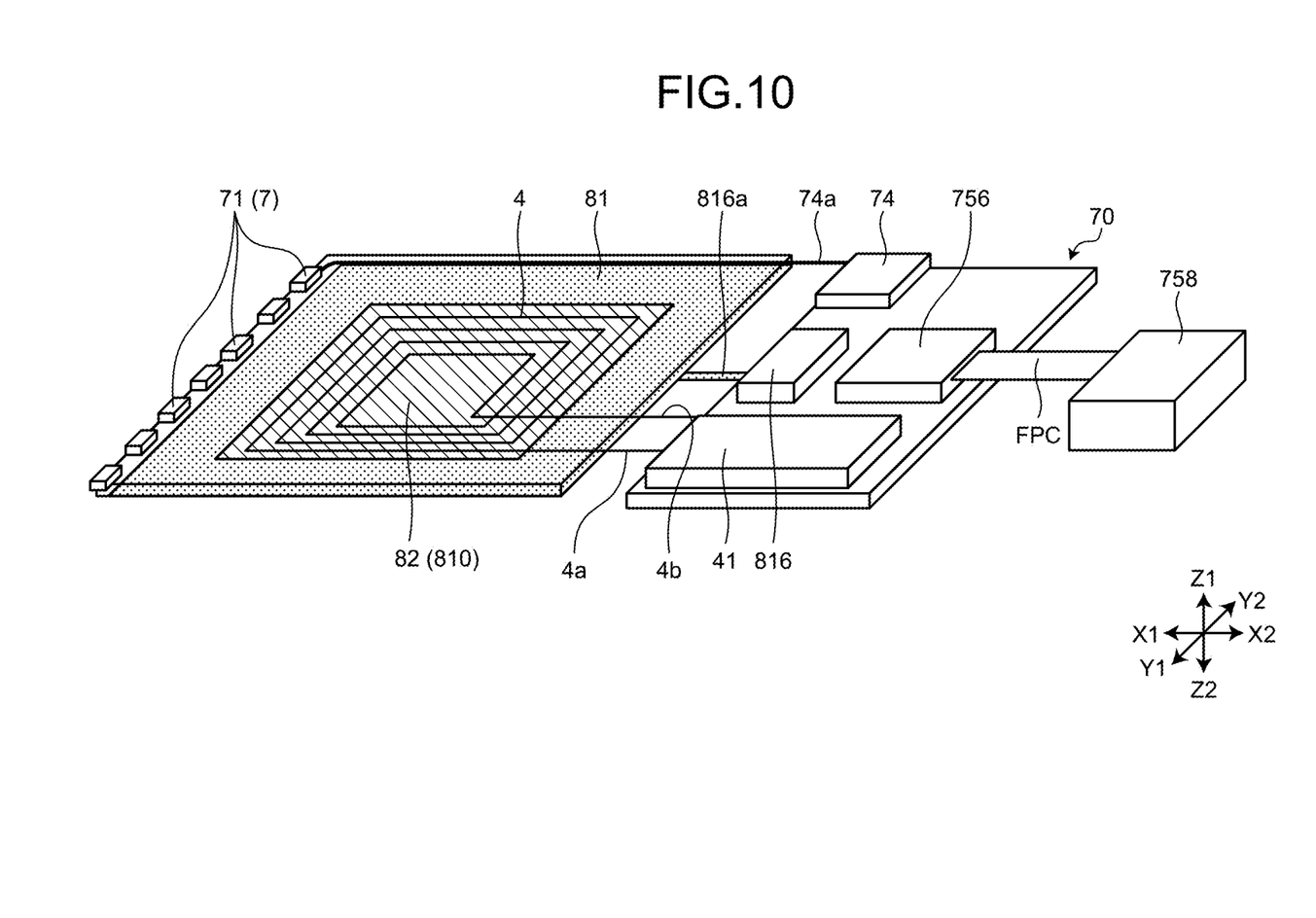
FIG. 10 is a perspective view schematically illustrating a portion of a detection device according to a fifth embodiment of the present disclosure.

The following describes a fifth embodiment of the present disclosure. FIG. 10 is a perspective view schematically illustrating a portion of a detection device according to the fifth embodiment.

In the first embodiment, the antenna coil 4 is provided on the first surface 21 of the light guide plate 2. In the fifth embodiment, the antenna coil 4 is provided on the optical filter 82. A specific description will be given below.

As illustrated in FIG. 10, the optical sensor 81 and the optical filter 82 are substantially rectangular as viewed in the Z direction. The optical filter 82 is disposed on the upper side (Z1 side) of the optical sensor 81. The optical filter 82 has a smaller rectangular shape than the optical sensor 81. The optical filter 82 is disposed in a central portion of the optical sensor 81. The antenna coil 4 is provided on the upper surface of the optical filter 82. The antenna coil 4 according to the present embodiment includes a light-transmitting conductive material, for example. The antenna coil 4 is disposed in a winding state on the upper surface of the optical filter 82 as viewed in the Z direction. Specifically, the ends 4a and 4b of the antenna coil 4 are electrically coupled to the RFID communication circuit 41 (refer to FIG. 2). The antenna coil 4 extends from the end 4a to the end 4b while winding, for example, three times on the upper surface of the optical filter 82. In the present embodiment, the antenna coil 4 is substantially rectangular as viewed in the Z direction.

As described above, according to the fifth embodiment, the optical sensor 81 is provided with the detection surface 810 having the photodiodes 813. The antenna coil 4 contains a light-transmitting conductive material and overlaps the detection surface 810 as viewed in the Z direction.

Therefore, compared with the embodiment in which the antenna coil 4 is disposed on the outer peripheral side of the detection surface 810 of the optical sensor 81, the optical sensor 81 can be made smaller and, in turn, the detection device 100 can be downsized.

What is claimed is:

1. A detection device comprising:
   a light-transmitting light guide plate that has a first surface on one side in a first direction and on which an object to be detected is to be placed so as to overlap the first surface;
   an optical sensor that is disposed on the other side in the first direction with respect to the light guide plate so as to overlap the light guide plate and comprises a plurality of photodiodes arranged in a planar configuration;
   a light source that is disposed adjacent to the light guide plate in a second direction intersecting the first direction and is configured to emit light to a side surface of the light guide plate;
   an optical filter disposed on the other side of the guide plate; and
   an antenna coil disposed so as to overlap at least either one of the light guide plate and the optical sensor as viewed in the first direction, wherein
   the optical sensor, the light source, and the antenna coil are electrically coupled to a control board and
   the optical filter, the antenna coil, and the optical sensor are stacked in this order as viewed in the first direction from the other side of the light guide plate, with the optical filter facing the other side of the light guide plate.

2. The detection device according to claim 1, wherein
   the optical sensor has a detection surface provided with the photodiodes, and
   the antenna coil is disposed on an outer peripheral side of the detection surface of the optical sensor so as to wind around the detection surface, as viewed in the first direction.

3. The detection device according to claim 1, wherein the antenna coil contains metal.

4. The detection device according to claim 1, wherein the antenna coil contains a light-transmitting conductive material.

5. The detection device according to claim 1, wherein
the optical sensor has a detection surface provided with the photodiodes, and
the antenna coil contains a light-transmitting conductive material and overlaps the detection surface as viewed in the first direction.

6. The detection device according to claim 1, wherein
the light guide plate has a second surface on the other side in the first direction, and
the second surface is provided with a plurality of scatterers configured to cause the light incident from the light source to exit from the first surface.

7. The detection device according to claim 1, comprising:
an image generation circuit configured to perform a first process to calculate differential image data that indicates a detection result of the object to be detected based on a difference between image data of the object to be detected captured by the optical sensor and base image data; and
a radio-frequency identifier (RFID) communication circuit configured to perform a second process to receive information of an RFID tag of the object to be detected via the antenna coil.

8. The detection device according to claim 7, wherein
the second process is omitted when the first process is established, and
the first process is omitted when the second process is established.

* * * * *